United States Patent
Shepelev et al.

(10) Patent No.: US 8,866,796 B2
(45) Date of Patent: Oct. 21, 2014

(54) COMPENSATION FOR AIR GAP IN AN INPUT DEVICE

(71) Applicant: Synaptics Incorporated, Santa Clara, CA (US)

(72) Inventors: Petr Shepelev, San Jose, CA (US); Adam Schwartz, Redwood City, CA (US)

(73) Assignee: Synaptics Incorporated, San Jose, CA (US)

( * ) Notice: Subject to any disclaimer, the term of this patent is extended or adjusted under 35 U.S.C. 154(b) by 137 days.

(21) Appl. No.: 13/722,309

(22) Filed: Dec. 20, 2012

(65) Prior Publication Data

US 2014/0176480 A1 Jun. 26, 2014

(51) Int. Cl.
*G06F 3/041* (2006.01)
*G06F 3/044* (2006.01)

(52) U.S. Cl.
CPC .................................. *G06F 3/044* (2013.01)
USPC ......................................... 345/174; 345/173

(58) Field of Classification Search
USPC ................................................ 345/173, 174
See application file for complete search history.

(56) References Cited

U.S. PATENT DOCUMENTS

| | | | |
|---|---|---|---|
| 5,940,065 A | 8/1999 | Babb et al. | |
| 6,888,536 B2 | 5/2005 | Westerman et al. | |
| 7,920,134 B2 | 4/2011 | Krah | |
| 8,077,160 B2 | 12/2011 | Land et al. | |
| 8,125,455 B2 | 2/2012 | Land et al. | |
| 2009/0322710 A1 | 12/2009 | Vandewater | |
| 2010/0026639 A1 | 2/2010 | Lee et al. | |
| 2010/0134448 A1* | 6/2010 | Park et al. | 345/176 |
| 2010/0321307 A1 | 12/2010 | Hirokawa | |
| 2011/0037735 A1 | 2/2011 | Land et al. | |
| 2012/0154339 A1 | 6/2012 | Land et al. | |
| 2013/0050144 A1* | 2/2013 | Reynolds | 345/174 |

* cited by examiner

*Primary Examiner* — Jonathan Boyd
(74) *Attorney, Agent, or Firm* — Patterson & Sheridan, LLP

(57) ABSTRACT

Embodiments of the present invention generally provide a processing system for a display device integrated with a capacitive sensing device. The processing system includes a driver module, a receiver module, and a determination module. The driver module is coupled to a plurality of common electrodes configured to be driven for display updating and capacitive sensing. The receiver module is coupled to a plurality of receiver electrodes and configured for receiving resulting signals with the receiver electrodes. The determination module is configured for comparing a delta capacitive image to one or more saturation capacitance values and replacing the saturation capacitance values with one or more capacitance values from the delta capacitive image. The determination module is further configured for determining calibration values based on the saturation capacitance values. The calibration values calibrate for an air gap defined between a cover lens of a display device and the plurality of common electrodes.

20 Claims, 9 Drawing Sheets

COMPENSATION FOR AIR GAP IN AN INPUT DEVICE

DESCRIPTION OF THE RELATED ART

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location, and/or motion of one or more input objects. Proximity sensor devices may be used to provide interfaces for the electronic system. For example, proximity sensor devices are often used as input devices for larger computing systems (such as touchpads integrated in, or peripheral to, notebook or desktop computers). Proximity sensor devices are also often used in smaller computing systems (such as touch screens integrated in cellular phones or tablet computers).

Proximity sensor devices may include one or more types of electrodes configured for display updating and/or for transmitting input sensing signals. In configurations in which the sensing region of the proximity sensor device is integrated with or overlaps the display region of the computing device, transparent electrodes may be used to prevent the sensing region from significantly obscuring the user's view of the display region. Such electrodes are commonly composed of a transparent conductive oxide material, such as indium tin oxide (ITO). The device layer on which these electrodes are disposed may be separated from a cover lens of the device by an air gap. In such designs, the air gap may act as a dielectric layer, affecting input sensing signals which are transmitted and received by the device. Further, the air gap thickness may vary as a function of location on the proximity sensor device and may vary on a part-to-part basis between different proximity sensor devices. Consequently, the presence of an air gap within the proximity sensor device may affect input sensing signals in an unpredictable manner.

Therefore, there is a need for a system and method for determining the parameters of an air gap and compensating for the effect of the air gap on input sensing signals.

SUMMARY OF THE INVENTION

Embodiments of the present invention generally provide a processing system for a display device integrated with a capacitive sensing device. The processing system includes a driver module having driver circuitry. The driver module is coupled to a plurality of common electrodes configured to be driven for display updating and capacitive sensing. The processing system further includes a receiver module coupled to a plurality of receiver electrodes and configured for receiving resulting signals with the receiver electrodes when the plurality of common electrodes are driven for capacitive sensing by the driver module. The processing system further includes a determination module configured for determining a first capacitive image based on the resulting signals, comparing the first capacitive image to a baseline capacitive image to determine a delta capacitive image, and comparing the delta capacitive image to one or more saturation capacitance values. The determination module is further configured for replacing the one or more saturation capacitance values with one or more capacitance values from the delta capacitive image and determining one or more calibration values based on the one or more saturation capacitance values. The one or more calibration values calibrate for an air gap defined between a cover lens of a display device integrated with a capacitive sensing device and the plurality of common electrodes.

Embodiments of the present invention may also provide a display device integrated with a capacitive sensing device. The display device includes a plurality of common electrodes, a plurality of receiver electrodes, and a processing system coupled to the plurality of common electrodes and the plurality of receiver electrodes. The processing system is configured to drive the plurality of common electrodes for display updating and capacitive sensing, receive resulting signals with the receiver electrodes when the plurality of common electrodes are driven for capacitive sensing, and determine a first capacitive image based on the resulting signals. The processing system is further configured to compare the first capacitive image to a baseline capacitive image to determine a delta capacitive image, compare the delta capacitive image to one or more saturation capacitance values, and, in response to the comparison, replace the one or more saturation capacitance values with one or more capacitance values from the delta capacitive image. The processing system is further configured to determine one or more calibration values based on the one or more saturation capacitance values. The display device further includes a cover lens disposed over the plurality of common electrodes. The one or more calibration values calibrate for an air gap defined between the cover lens and the plurality of common electrodes.

Embodiments of the present invention may also provide a method of capacitive sensing with a display device integrated with a capacitive sensing device having a plurality of common electrodes and a plurality of receiver electrodes. The method includes driving the plurality of common electrodes for display updating and capacitive sensing, receiving resulting signals from the receiver electrodes when the plurality of common electrodes are driven for capacitive sensing, and determining a first capacitive image based on the resulting signals. The method further includes comparing the first capacitive image to a baseline capacitive image to determine a delta capacitive image, comparing the delta capacitive image to one or more saturation capacitance values, and, in response to the comparing, replacing the one or more saturation capacitance values with one or more capacitance values from the delta capacitive image. The method further includes determining one or more calibration values based on the one or more saturation capacitance values. The one or more calibration values calibrate for an air gap defined between a cover lens of a display device integrated with a capacitive sensing device and the plurality of common electrodes.

BRIEF DESCRIPTION OF THE DRAWINGS

So that the manner in which the above recited features can be understood in detail, a more particular description, briefly summarized above, may be had by reference to embodiments, some of which are illustrated in the appended drawings. It is to be noted, however, that the appended drawings illustrate only embodiments of the invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present invention generally provide a system and method for determining input device parameters, such as, without limitation, the characteristics of an air gap disposed between a cover lens and a sensor assembly of an input device. Various embodiments may further include calculating and applying calibration values (e.g., plane coefficients, scaling factors, etc.) to calibrate and/or compensate for the input device parameters. Advantageously, by determining and compensating for non-uniformities in an input device, the techniques described herein may increase the performance of the input device.

Figure 1:
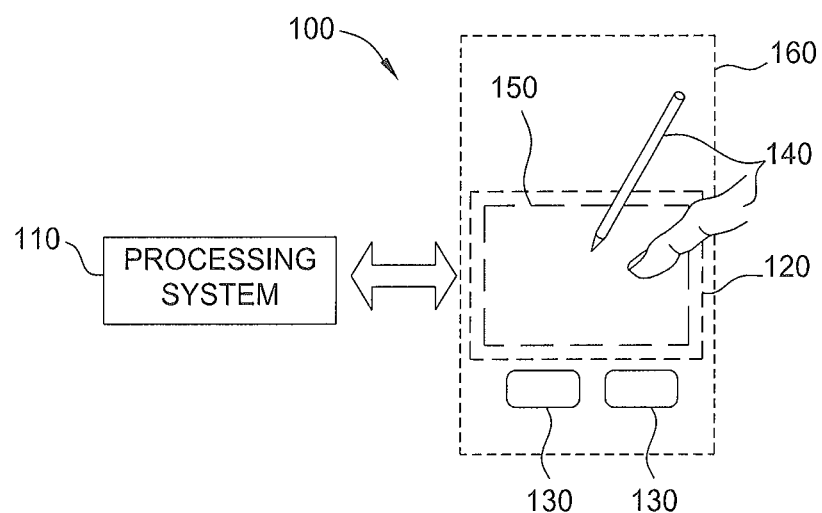
FIG. 1 is a block diagram of an exemplary input device in accordance with embodiments of the invention.

Turning now to the figures, FIG. 1 is a block diagram of an exemplary input device 100 in accordance with embodiments of the invention. The input device 100 comprises a display device 160 having an integrated sensing device, such as a capacitive sensing device. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include the input device 100 and separate joysticks or key switches. Further example electronic systems include peripherals such as data input devices (including remote controls and mice) and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system or can be physically separate from the electronic system. As appropriate, the input device 100 may communicate with parts of the electronic system using any one or more of the following: buses, networks, and other wired or wireless interconnections (including serial and/or parallel connections). Examples include $I^2C$, SPI, PS/2, Universal Serial Bus (USB), Bluetooth, RF, and IRDA.

In the embodiment depicted in FIG. 1, the input device 100 is shown as a proximity sensor device (also often referred to as a "touchpad" or a "touch sensor device") configured to sense input provided by one or more input objects 140 in a sensing region 120. Example input objects 140 include fingers and styli, as shown in FIG. 1.

Sensing region 120 overlays the display screen of the display device 160 and encompasses any space above, around, in, and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g., a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100. The face sheet (e.g., an LCD lens) may provide a useful contact surface for an input object.

The input device 100 may utilize any combination of sensor components and sensing technologies to detect user input in the sensing region 120. The input device 100 comprises one or more sensing elements for detecting user input. Some implementations are configured to provide images that span one, two, three, or higher dimensional spaces. Some implementations are configured to provide projections of input along particular axes or planes. Cursors, menus, lists, and items may be displayed as part of a graphical user interface and may be scaled, positioned, selected scrolled, or moved.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field.

Nearby input objects cause changes in the electric field and produce detectable changes in capacitive coupling that may be detected as changes in voltage, current, or the like.

Some capacitive implementations utilize arrays or other regular or irregular patterns of capacitive sensing elements 150, such as sensor electrodes, to create electric fields. In some capacitive implementations, separate sensing elements 150 may be ohmically shorted together to form larger sensor electrodes. Some capacitive implementations utilize resistive sheets (e.g., may comprise a resistive material such as ITO or the like), which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, changing the measured capacitive coupling. In one implementation, an absolute capacitance sensing method operates by modulating sensor electrodes with respect to a reference voltage (e.g., system ground) and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals and/or to one or more sources of environmental interference (e.g., other electromagnetic signals). Sensor electrodes may be dedicated transmitters or receivers, or sensor electrodes may be configured to both transmit and receive. Alternatively, the receiver electrodes may be modulated relative to ground.

In some touch screen embodiments, transmitter electrodes comprise one or more common electrodes (e.g., "V-com electrode") used in updating the display of the display screen. These common electrodes may be disposed on an appropriate display screen substrate. For example, the common electrodes may be disposed on the TFT glass in some display screens (e.g., in-plane switching (IPS) or plane-to-line switching (PLS)), on the bottom of the color filter glass of some display screens (e.g., patterned vertical alignment (PVA) or multi-domain vertical alignment (MVA)), configured to drive an organic light emitting diode OLED display, etc. In such embodiments, the common electrode can also be referred to as a "combination electrode," since it performs multiple functions. In various embodiments, two or more transmitter electrodes may share one or more common electrode. In addition, other display elements, such as source drivers, gate select lines, storage capacitors, and the like, may be used to perform capacitive sensing.

In FIG. 1, a processing system 110 is shown as part of the input device 100. The processing system 110 is configured to operate the hardware of the input device 100 to detect input in the sensing region 120. The sensing region 120 includes an array of sensing elements 150. The processing system 110 comprises parts of, or all of, one or more integrated circuits (ICs) and/or other circuitry components. For example, a processing system for a mutual capacitance sensor device may comprise transmitter circuitry configured to transmit signals with transmitter sensor electrodes and/or receiver circuitry configured to receive signals with receiver sensor electrodes. In some embodiments, the processing system 110 also comprises electronically-readable instructions, such as firmware code, software code, and the like. In some embodiments, components of the processing system 110 are located together, such as near sensing element(s) of the input device 100. In other embodiments, components of processing system 110 are physically separate with one or more components close to sensing element(s) of input device 100 and one or more components elsewhere. For example, the input device 100 may be a peripheral coupled to a desktop computer, and the processing system 110 may include software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g., to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. In further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120 or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 of the sensing device overlaps at least part of an active area of a display screen of the display device 160. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
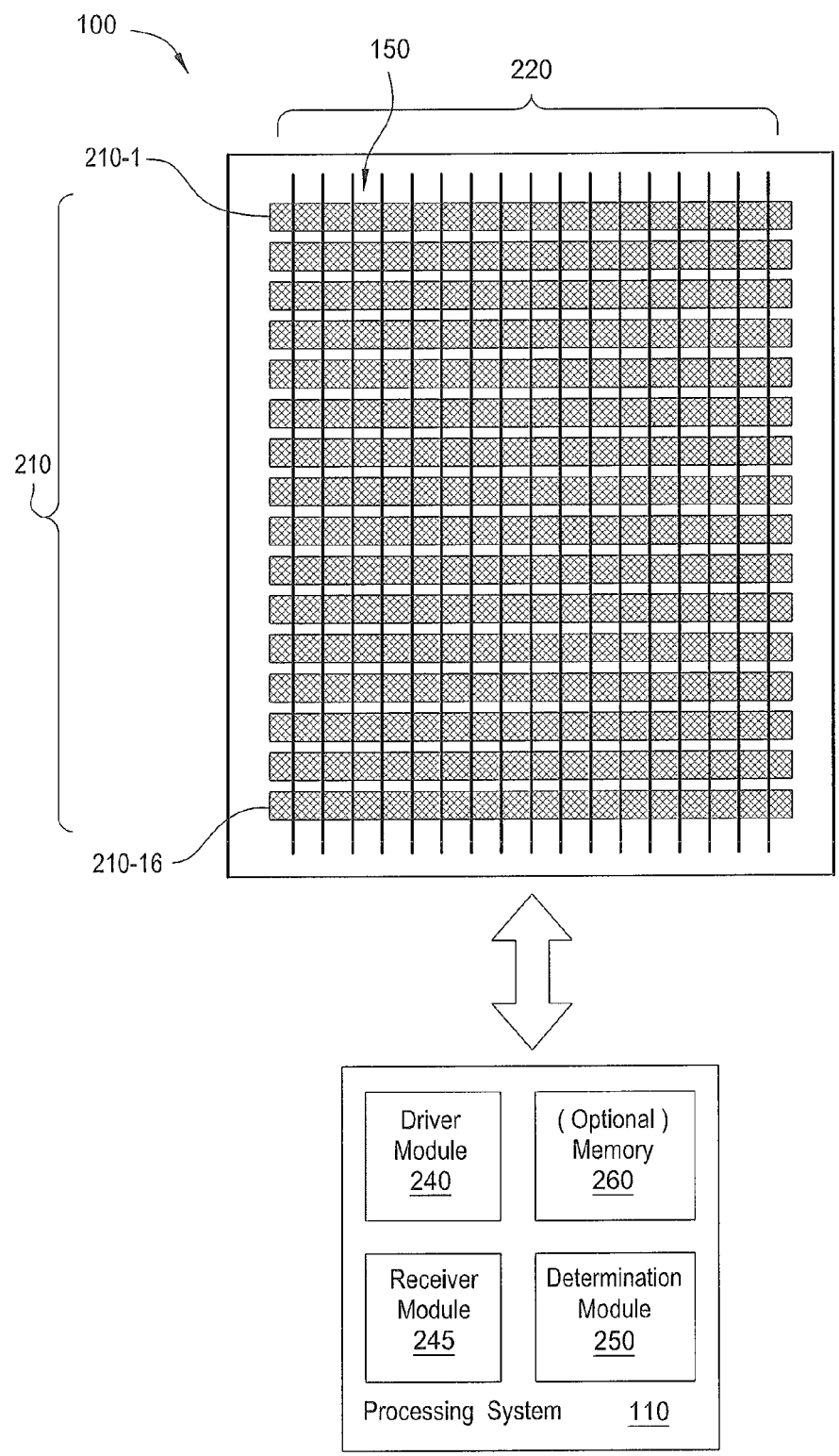
FIG. 2 is a partial schematic plan view of the input device of FIG. 1 in accordance with embodiments of the invention.

FIG. 2 is a partial schematic plan view of the input device 100 of FIG. 1 in accordance with embodiments of the invention. The input device 100 includes an array of sensing elements 150 and processing system integrated circuit (IC) 110. The array of sensing elements 150 includes a plurality of transmitter electrodes 210 (e.g., 210-1, 210-2, 210-3, etc.) and a plurality of receiver electrodes 220 (e.g., 220-1, 220-2, 220-3, etc.). Each transmitter electrode 210 may comprise one or more common electrodes. Additionally, in various embodiments, each receiver electrode 220 may comprise one or more common electrodes. The processing system IC 110 is coupled to the array of sensing elements 150, for example, through one or more routing traces.

Although a single processing system IC 110 is illustrated in FIG. 2, the input device 100 may include any appropriate number of processing system ICs 110. As shown in FIG. 2, the processing system IC 110 may include a driver module 240, a receiver module 245, a determination module 250, an optional memory 260, and/or a synchronization mechanism (not shown in FIG. 2).

The receiver module 245 is coupled to the plurality of receiver electrodes 220 and configured to receive resulting signals from the receiver electrodes 220 indicative of input (or lack of input) in the sensing region 120 and/or of environmental interference. The receiver module 245 may also be configured to pass the resulting signals to the determination module 250 for determining the presence of an input object and/or to the optional memory 260 for storage.

The driver module 240, which includes driver circuitry, may be configured for updating images on the display screen of the display device 160. For example, the driver circuitry may be configured to apply one or more pixel voltages to the display pixel electrodes through pixel source drivers. The driver circuitry may also be configured to apply one or more common drive voltages to the common electrodes to update the display screen. In addition, the processing system IC 110 is configured to operate the common electrodes as transmitter electrodes for input sensing by driving transmitter signals onto the common electrodes.

While the processing system illustrated in FIG. 2 includes one IC, the processing system may be implemented with more ICs to control the various components in the input device. For example, the functions of the processing system IC 110 may be implemented in more than one integrated circuit that can control the display module elements (e.g., common electrodes) and drive transmitter signals and/or receive resulting signals received from the array of sensing elements 150. In embodiments where there is more than one processing system IC, communications between separate processing system ICs 110 may be achieved through a synchronization mechanism, which sequences the signals provided to the common electrodes. Alternatively the synchronization mechanism may be internal to any one of the ICs.

Transmitter electrodes 210 and receiver electrodes 220 are ohmically isolated from each other by one or more insulators which separate the transmitter electrodes 210 from the receiver electrodes 220 and prevent them from electrically shorting to each other. The electrically insulative material separates the transmitter electrodes 210 and the receiver electrodes 220 at cross-over areas at which the electrodes intersect. In one such configuration, the transmitter electrodes 210 and/or receiver electrodes 220 are formed with jumpers connecting different portions of the same electrode. In other configurations, the transmitter electrodes 210 and the receiver electrodes 220 are separated by one or more layers of electrically insulative material or by one or more substrates, as described in further detail below. In still other configurations, the transmitter electrodes 210 and the receiver electrodes 220 are optionally disposed on a single layer of the input device 100.

The areas of localized capacitive coupling between transmitter electrodes 210 and receiver electrodes 220 may be termed "capacitive pixels." The capacitive coupling between the transmitter electrodes 210 and receiver electrodes 220 changes with the proximity and motion of input objects in the sensing region 120 associated with the transmitter electrodes 210 and the receiver electrodes 220.

In some embodiments, the sensor pattern is "scanned" to determine these capacitive couplings. That is, the transmitter electrodes are driven to transmit transmitter signals. Transmitters may be operated such that one transmitter electrode transmits at one time, or multiple transmitter electrodes transmit at the same time. Where multiple transmitter electrodes transmit simultaneously, these multiple transmitter electrodes may transmit the same transmitter signal and effectively produce an effectively larger transmitter electrode, or these multiple transmitter electrodes may transmit different transmitter signals. For example, multiple transmitter electrodes may transmit different transmitter signals according to one or more coding schemes that enable their combined effects on the resulting signals of receiver electrodes to be independently determined.

The receiver sensor electrodes may be operated singly or multiply to acquire resulting signals. The resulting signals may be used to determine measurements of the capacitive couplings at the capacitive pixels.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

Figure 3A:
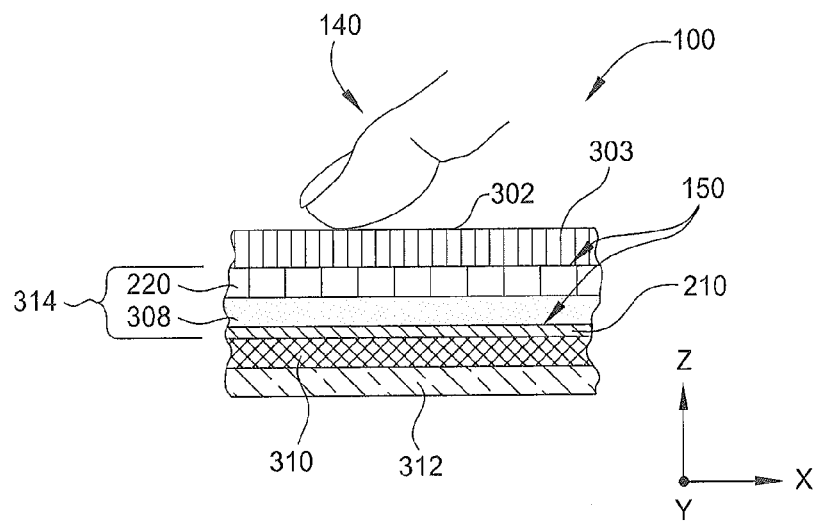
FIGS. 3A-3B are partial schematic cross-sectional views of an embodiment of the input device of FIG. 1.
Figure 3B:
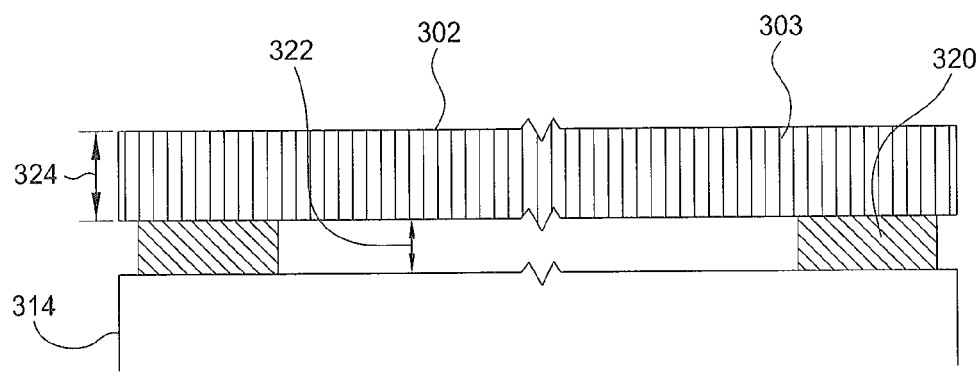
Figure 3C:
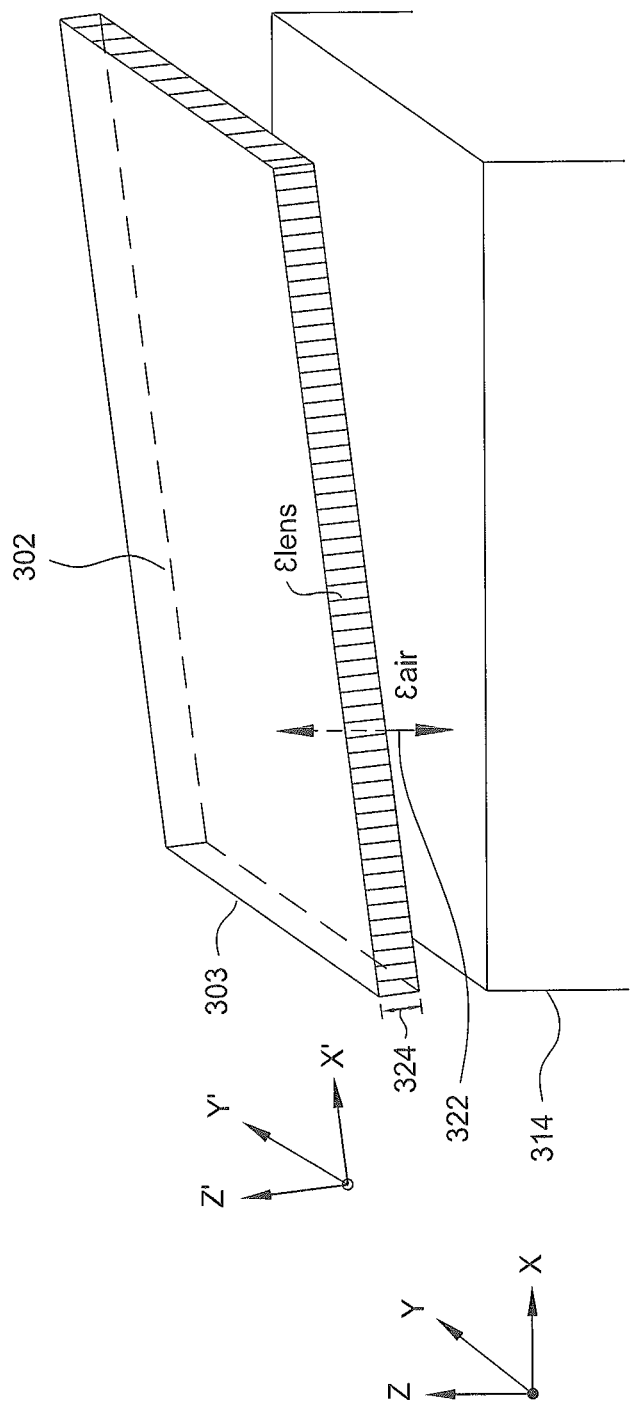
FIG. 3C is a perspective view of an embodiment of the input device of FIG. 1.

FIGS. 3A-3C are partial schematic cross-sectional views of an embodiment of the input device 100 of FIG. 1. In this embodiment, the input device 100 includes an input surface 302 provided by a first substrate 303 disposed between the input object 140 and the sensing elements 150 of the sensor assembly 314. The first substrate 303 may include a cover lens or window comprising glass, plastic, or any other substantially transparent material. The sensing elements 150 of the sensor assembly 314 include the plurality of transmitter electrodes 210 and the plurality of receiver electrodes 220. Each transmitter electrode 210 and/or receiver electrode 220 may comprise one or more common electrodes. A second substrate 308 may include a color filter glass. The input device 100 may include a display element layer 310 and a third substrate 312. In one embodiment the third substrate 312 is an active layer comprising the switching and driving circuitry of the display device. For example, the third substrate 312 may be a thin-film transistor (TFT) layer or the like. In various embodiments, the display element layer 310 may include a layer containing field-effect display materials, such as liquid crystal (LC), organic light emitting diodes (OLED), or other display materials.

In one embodiment the receiver electrodes 220 may be disposed such that they are between the transmitter electrodes 210 and the input surface 302. In other embodiments, the receiver electrodes 220 may be disposed on the input surface 302 or second substrate 308. In still other embodiments, the receiver electrodes 220 may be disposed on a substrate between the input surface 302 and second substrate 308, such as a polarizer film (not shown), an anti-shatter film, and the like. As discussed with respect to FIG. 2, each transmitter electrode 210 may comprise one or more common electrodes, which may be used both for transmitting input sensing signals for sensing positional information of the input object 140 and for updating the display device 160. In various embodiments, the transmitter electrodes 210 may be disposed on the third substrate 312 or second substrate 308 such that they are insulated from the receiver electrodes 220. While not shown, in yet another embodiment, the transmitter electrodes 210 and the receiver electrodes 220 are disposed such that they are on the same layer of a substrate. For example, the transmitter electrodes 210 and the receiver electrodes 220 may be disposed on a first side of second substrate 308 or on a first side of third substrate 312. In further embodiments, the input device 100 may include additional layers not shown, and at least a portion of the transmitter electrodes 210 and/or the receiver electrodes 220 may be disposed on one of the additional layers.

As shown in FIG. 3B, the first substrate 303 may be spaced apart from the sensor assembly 314 (e.g., by one or more shims 320), creating an air gap 322 between the bottom surface of the first substrate 303 and the top surface of the sensor assembly 314. This air gap 322 may significantly attenuate the effect of the input object 140 on the resulting signals received by the receiver electrodes 220. For example, whereas the dielectric constant of the cover lens $\in_{lens}$ may be approximately 7, the dielectric constant of air $\in_{air}$ is approximately 1. Thus, the effect of adding a 1 millimeter (mm) air gap may be similar to the effect of adding approximately 7 mm to the thickness of the cover lens. Moreover, as shown in FIG. 3C, the plane defined by the bottom surface of the first substrate 303 may be tilted (i.e., non-parallel) relative to the plane defined by the top surface of the sensor assembly 314, causing the air gap 322 distance $d_{air\ gap}$ to vary as a function of position on the input surface 302 of the sensing region 120. For example, variations in the air gap 322 and/or tilting of the first substrate 303 may result from non-uniformities produced during manufacturing and/or assembly of the input device 100. Further, compression of the shims 320 and/or deflection of the first substrate 303 during use of the input device 100 may alter the parameters of the air gap 322. Accordingly, it is desirable to determine the distance of the air gap 322 as a function of location and/or compensate for variations in the air gap 322 at various locations across the sensing region 120 of the input device 100.

Air Gap Determination and Compensation

In various embodiments of the present invention, baseline capacitance and saturation capacitance values may be acquired from a sensor device (e.g., input device 100) as a function of location within a sensing region. The capacitance values may then be tracked and processed in order to infer sensor device parameters, such as, for example, the thickness of an air gap between a cover lens and a sensor assembly of the sensor device. Additionally, the determined air gap value(s) may be used to calculate plane coefficients and/or one or more scaling factors. Finally, the plane coefficient and/or scaling factors then may be used to perform compensation on data acquired with the sensor device. Advantageously, by determining the parameters of and compensating for an air gap in a sensor device, input sensing performance is substantially increased. Moreover, compensation may be determined and applied in a manner which is transparent to the user of the sensor device.

Figure 4:
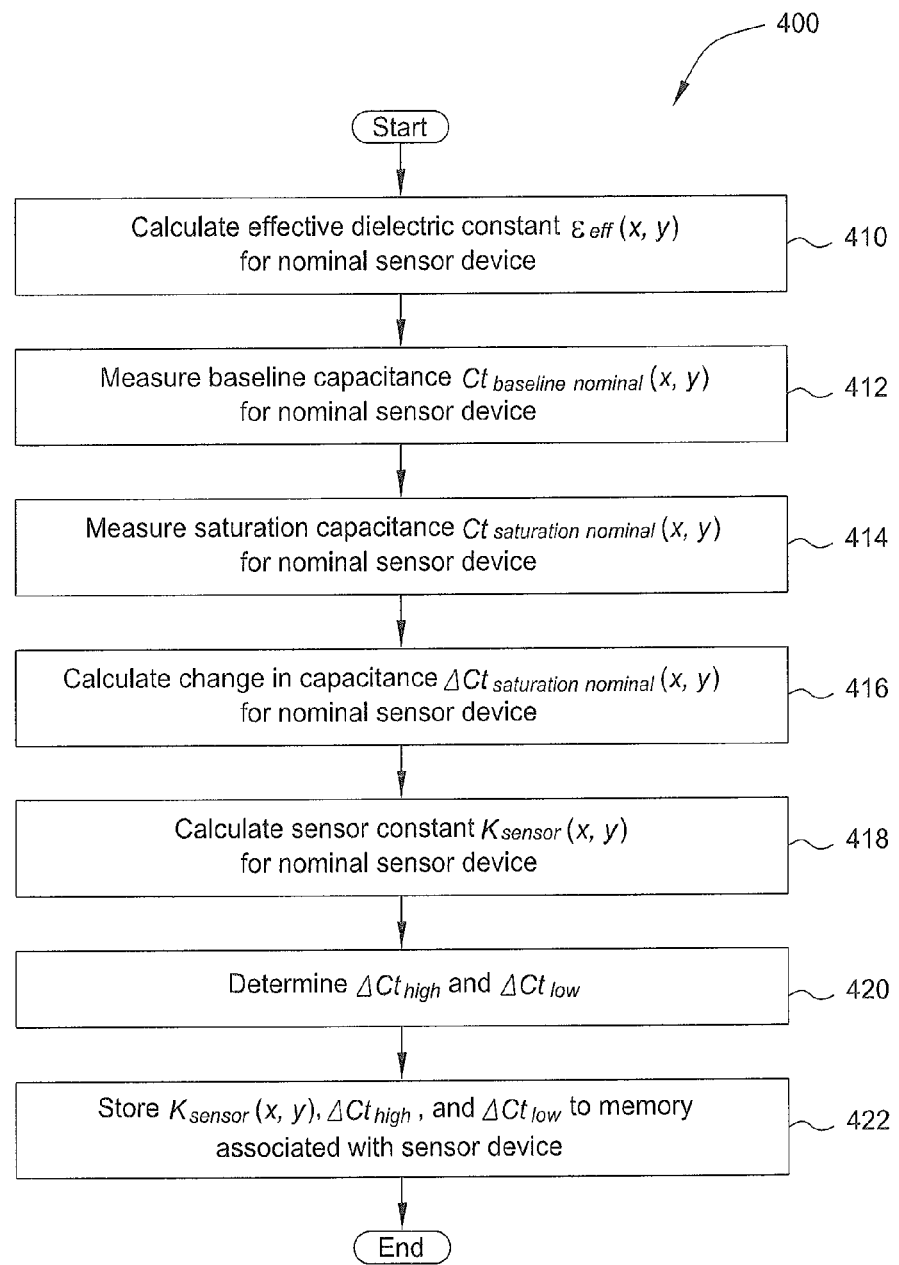
FIG. 4 is a flow diagram of method steps for calculating tuning values for a nominal sensor device, such as input device of FIGS. 1-3C.

FIG. 4 is a flow diagram of a method 400 for calculating tuning values for a nominal sensor device, such as input device 100 of FIG. 1. Although the method 400 is described in conjunction with FIGS. 1-3C, persons skilled in the art will understand that any system configured to perform the method, in any appropriate order, falls within the scope of the present invention.

Tuning values may be calculated for a nominal sensor in order to establish reference values from which per part variations may be determined. The tuning values may be stored in a memory associated with each sensor (e.g., as firmware in memory 260 of input device 100) and retrieved when per part air gap 322 and compensation scaling factors are calculated. When calculating tuning values for the nominal sensor, the cover lens (e.g., first substrate 303) of the nominal sensor is assumed to be parallel to the sensing region (e.g., sensor assembly 314 of sensing region 120). Additionally, the air gap of the nominal sensor $d_{air\ gap\ nominal}$ is known.

The method 400 begins at step 410, where an effective dielectric constant $\epsilon_{eff}(x,y)$ of the cover lens and air gap for the nominal sensor device is calculated using a paralle-plate capacitor model. The effective dielectric constant $\epsilon_{eff}(x,y)$ for the nominal sensor device may be calculated as a function of location (e.g., sensor coordinates, capacitive pixel location, and the like) according to Equation 1, shown below, where $\epsilon_{lens}$ is the dielectric constant of the cover lens, $\epsilon_{air}$ is the dielectric constant of air, $d_{lens}$ is the is thickness of the cover lens, and $d_{air}$ is the thickness or distance of the air gap 322.

$$\varepsilon_{\mathit{eff}}(x,y) = \frac{\varepsilon_{lens} \times (d_{lens}(x,y) + d_{air}(x,y))}{d_{lens}(x,y) + \varepsilon_{lens} \times d_{air}(x,y)} = \frac{\varepsilon_{lens} \times (d_{lens} + d_{air}(x,y))}{d_{lens} + \varepsilon_{lens} \times d_{air}(x,y)} \quad \text{(Eq. 1)}$$

Next, at step 412, a baseline capacitance $Ct_{baseline\ nominal}(x,y)$ is measured for the nominal sensor as a function of location within the sensing region 120. Each location for which capacitance values are acquired may correspond to a capacitive pixel. The baseline capacitance may include capacitance values acquired when no input object 140 is present in the sensing region 120.

At step 414, a saturation capacitance $CT_{saturation\ nominal}(x,y)$ is measured for the nominal sensor as a function of location within the sensing region 120. The saturation capacitance may be measured by placing an input object on one or more locations of the sensing region 120. Acquiring saturation capacitance values may require that the contact area under an input object 140 is large enough to produce a response which matches or approximates the saturating capacitance from one or more capacitive pixels under the input object 140. In one embodiment, a saturation capacitance may be acquired for multiple locations (e.g., all locations) on the sensing region 120 by placing a conductive grounding plate on the sensing region 120. At step 416, the resulting delta capacitance $\Delta Ct_{saturation\ nominal}(x,y)$ due to the input object(s) 140 may be calculated by subtracting the baseline capacitance $Ct_{baseline\ nominal}(x,y)$ from the saturation capacitance $Ct_{saturation\ nominal}(x,y)$ at each (x,y) location of the sensing region 120. The delta capacitance $\Delta Ct_{saturation\ nominal}(x,y)$ may vary as a function of location due to variations in the sensitivity of the nominal sensor. Such variations may be caused by the relationship between the sensing frequency and the settling time of each capacitive pixel (x,y) in the nominal sensor. However, sensing frequency may be tuned such that the impact from these variations in $\Delta Ct_{saturation\ nominal}(x,y)$ are negligible and/or compensated for by per electrode scaling factors.

Next, at step 418, if it is assumed that the sensing frequency is tuned as discussed above, a nominal sensor constant $K_{sensor}(x,y)$ may be calculated according to Equation 2, where $mean_{x,y}(\Delta Ct_{saturation\ nominal}(x,y))$ is the average change in capacitance across the nominal sensor. Since it has been assumed that variations in $\Delta Ct_{saturation\ nominal}$ as a function of location (x,y) are neglible and/or compensated for by per electrode scaling factors, $K_{sensor}$ may be treated as a constant with respect to each sensor coordinate (x,y), as shown below in Equation 2.

$$K_{sensor} = mean_{x,y}(\Delta Ct_{saturation\ nominal}(x,y)) \times \frac{1}{\varepsilon_{\mathit{eff}}} \quad \text{(Eq. 2)}$$

At step 420, the measured delta capacitance $\Delta Ct_{saturation\ nominal}(x,y)$ values acquired for the nominal sensor are analyzed to determine high and low values ($\Delta Ct_{high}$ and $\Delta Ct_{low}$). The high and low values may correspond to a range of values above and below which a measured change in capacitance may be discarded or subjected to additional analysis. For example, because $\Delta Ct_{high}$ and $\Delta Ct_{low}$ are the expected responses for the smallest possible air gap and largest possible air gap, respectively, a measured change in capacitance which is above $\Delta Ct_{high}$ or below $\Delta Ct_{low}$ may be determined to be an inaccurate measurement resulting from electromagnetic interference or from deflection and/or compression of one or more components of the sensor device. Further, the $\Delta Ct_{high}$ and $\Delta Ct_{low}$ may correspond to the highest and lowest changes in capacitance measured with the nominal sensor, or these high and low values may be determined by other statistical methods, such as by a percentage deviation from the $mean_{x,y}(\Delta Ct_{saturation\ nominal}(x,y))$ or based on one or more manufacturing tolerances. Exemplary equations (Eq. 3 and Eq. 4) for calculating $\Delta Ct_{high}$ and $\Delta Ct_{low}$ are shown below.

$$\Delta Ct_{low} = \frac{\varepsilon_{lens} \times (d_{lens} + d_{air\ largest})}{d_{lens} + \varepsilon_{lens} \times d_{air\ largest}} \times K_{sensor} \quad \text{(Eq. 3)}$$

$$\Delta Ct_{high} = \frac{\varepsilon_{lens} \times (d_{lens} + d_{air\ smallest})}{d_{lens} + \varepsilon_{lens} \times d_{air\ smallest}} \times K_{sensor} \quad \text{(Eq. 4)}$$

Finally, at step 422, the nominal sensor constant $K_{sensor}$ and the high and low values $\Delta Ct_{high}$ and $\Delta Ct_{low}$ are stored in a memory associated with a sensor device. During operation of the sensor device, these values may be retrieved and used as reference values from which the air gap $d_{air\ gap}$, plane coefficients (a,b,c), and per pixel scaling factors $S_i$ may be calculated, as described below with respect to FIGS. 5-7.

Figure 5:
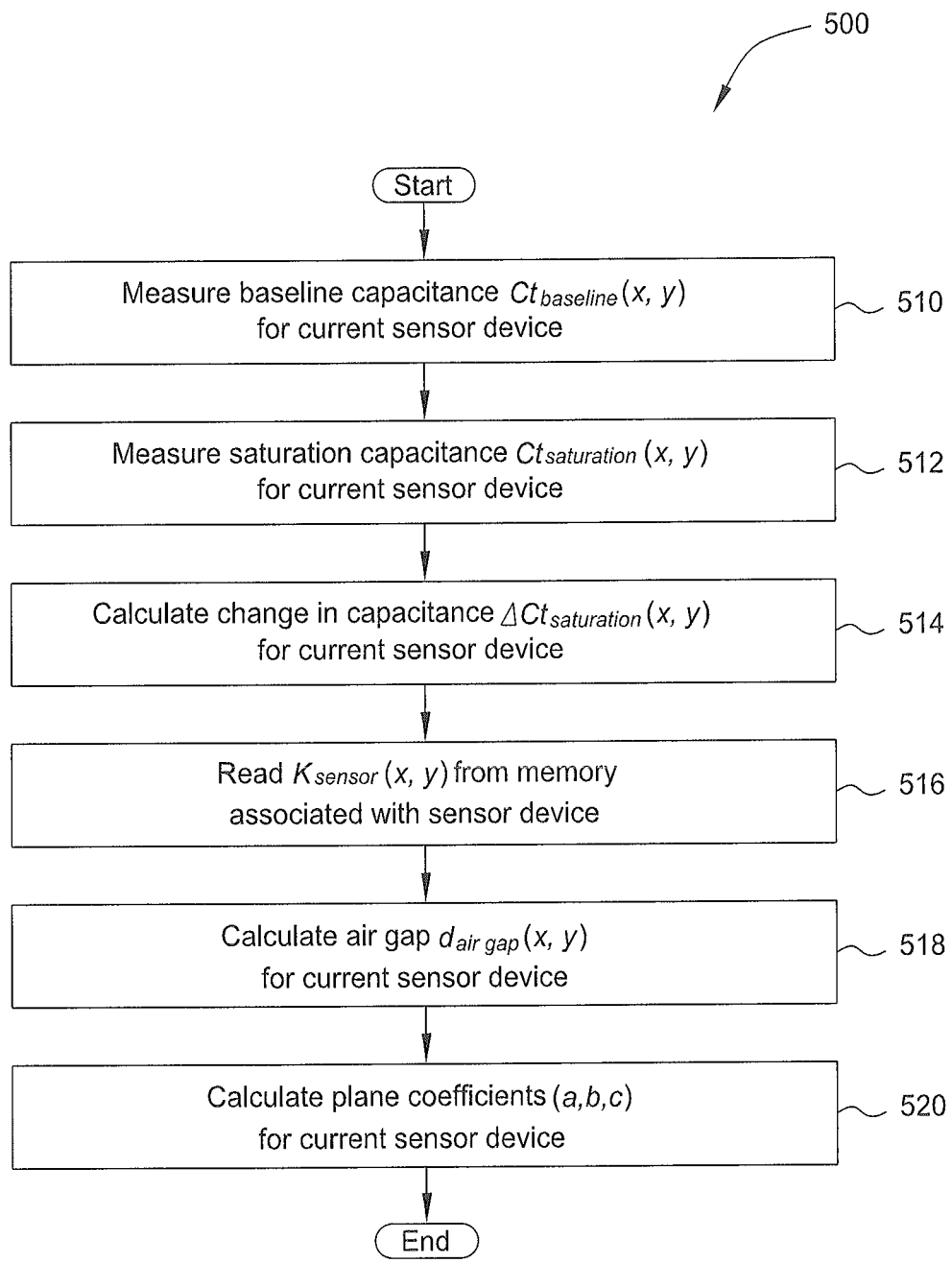
FIG. 5 is a flow diagram of method steps for determining an air gap and calculating plane coefficients for a sensor device.
Figure 6:
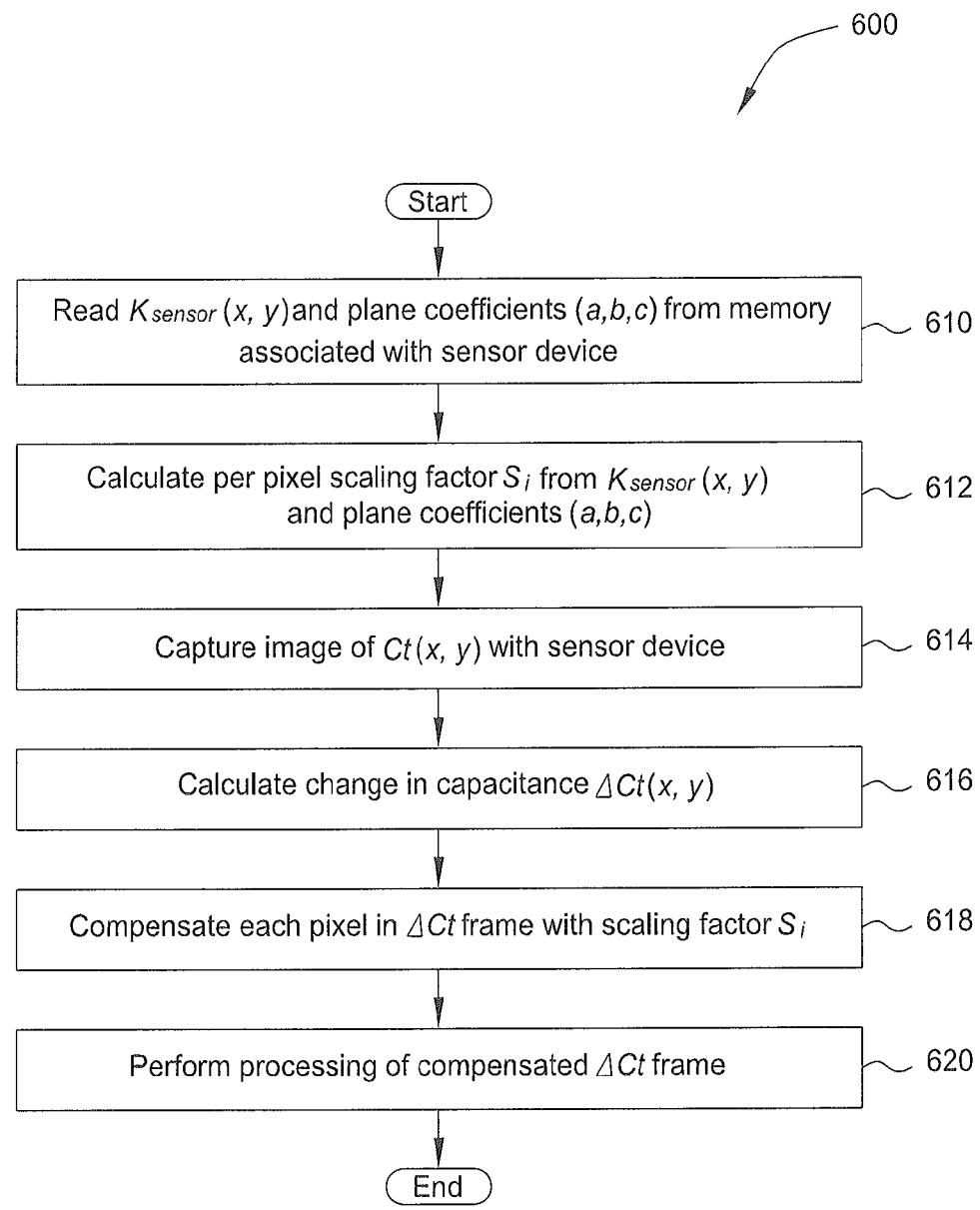
FIG. 6 is a flow diagram of method steps for performing compensation for an air gap during operation of a sensor device.
Figure 7:
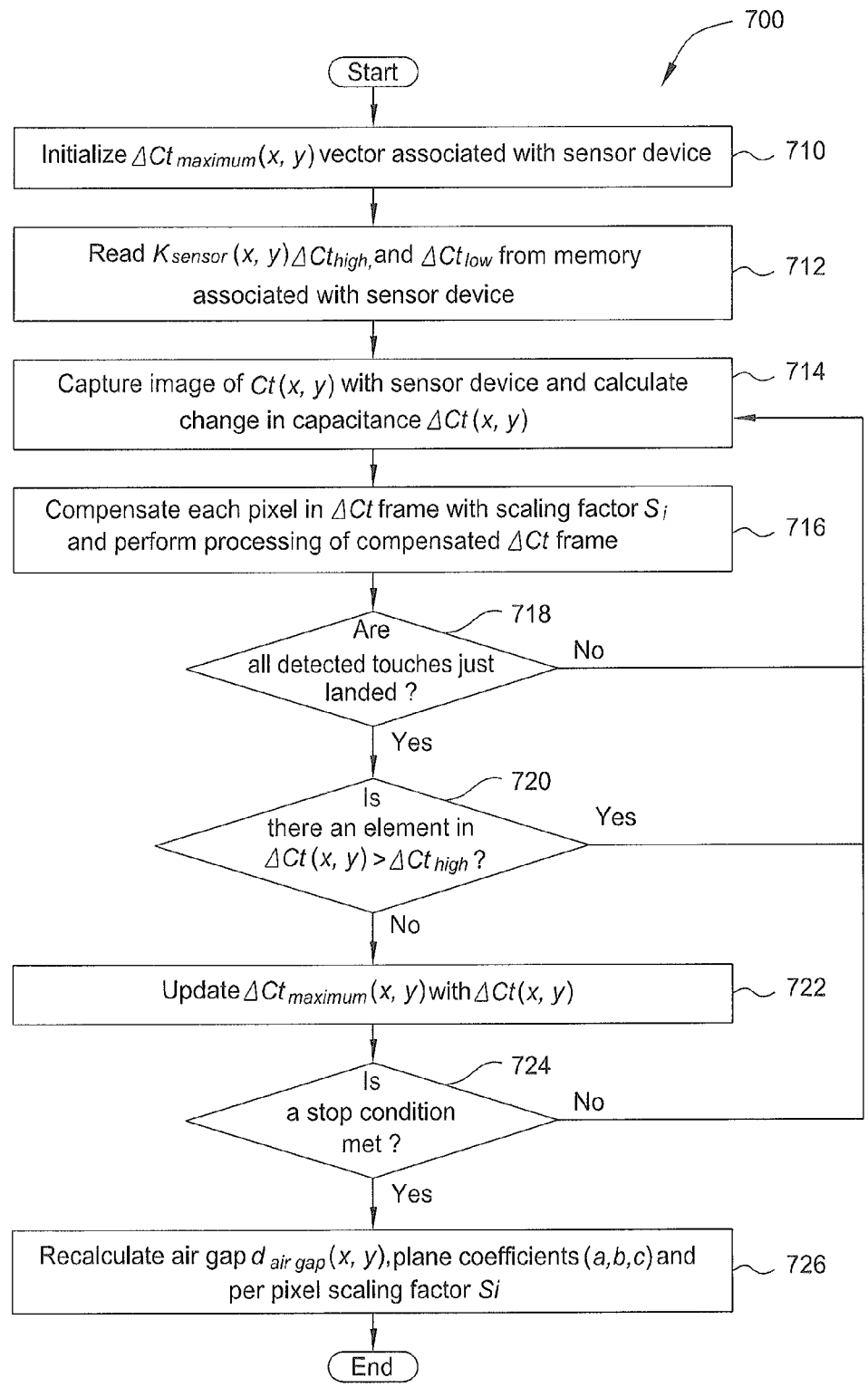
FIG. 7 is a flow diagram of method steps for determining an air gap, calculating plane coefficients, and performing compensation for the air gap during operation of a sensor device.

In contrast to FIG. 4, which describes a technique for determining reference values for a nominal sensor device, FIGS. 5-7 are directed to determining per part parameters (e.g., air gap, plane coefficients, and per capacitive pixel scaling factors) associated with sensor devices prior to and/or after the sensor devices have been distributed to end-users. For example, the techniques described with respect to FIG. 7 may enable the entire calibration process to be performed by the end-user of a sensor device. However, although the techniques of FIG. 4 have been described with respect to a nominal device, it is contemplated that these techniques also may be performed with sensor devices intended for distribution to end-users. Additionally, although the techniques of FIG. 5-7 are described with respect to sensor devices intended for end-users, it is contemplated that these techniques may be performed in a manufacturing or assembly setting to calculate reference values and/or per device parameters.

In various embodiments, the techniques described herein may be used to track and update saturation capacitance values and delta capacitance values acquired during operation of a sensor device. Tracking and updating these capacitance values as a function of sensor coordinates may then enable sensor device parameters, such as air gap thickness and cover lens orientation, to be inferred. As an example, sensor coordinates at which high saturation capacitance and/or delta capacitance values are measured may correspond to locations at which an air gap is small, and sensor coordinates at which low saturation capacitance and/or delta capacitance values are measured may correspond to locations at which an air gap is large. Thus, by continuously tracking and updating capacitance values, sensor device parameters, such as air gap, may be determined, and compensation for part-to-part variations may be applied.

FIG. 5 is a flow diagram of a method 500 for determining an air gap 322 and calculating plane coefficients for a sensor device, such as input device 100 of FIG. 1. Although the method 500 is described in conjunction with FIGS. 1-4, persons skilled in the art will understand that any system configured to perform the method, in any appropriate order, falls within the scope of the present invention.

The method 500 begins at step 510, where baseline capacitance values $Ct_{baseline}(x,y)$ are measured with the current sensor device. At step 512, saturation capacitance values $Ct_{saturation}(x,y)$ of the current sensor device are measured. As described with respect to FIG. 4, the saturation capacitance values of the sensor device may be measured by placing one or more input objects 140 on the sensing region 120 of the input device 100. At step 514, the resulting change in capacitance $\Delta Ct_{saturaton}(x,y)$ is calculated by subtracting the baseline capacitance values from the saturation capacitance values at each location (x,y) in the sensing region 120.

Next, at step 516, the nominal sensor constant $K_{sensor}$ may be read from a memory associated with the sensor device, and the air gap 322 $d_{air\,gap}(x,y)$ of the current sensor device may be calculated. The air gap 322 may be calculated as a function of location (x,y) in the sensing region according to Equation 5, shown below, where $\in_{lens}$ is the dielectric constant of the cover lens of the sensor device, $\in_{air}$ is the dielectric constant of air, and $d_{lens}$ is the thickness of the cover lens of the sensor device.

$$d_{air\,gap\,current}(x, y) = \frac{K_{sensor} \times d_{lens} \times \varepsilon_{lens} - \Delta Ct_{saturation\,current}(x, y) \times d_{lens}}{\Delta Ct_{saturation\,current}(x, y) \times \varepsilon_{lens} - K_{sensor} \times \varepsilon_{lens}} \quad (\text{Eq. 5})$$

Finally, at step 520, plane coefficients (a,b,c) for the sensor device may be calculated. The plane coefficients may encode the orientation (e.g., tilt) of a cover lens of the sensor device with respect to the sensor assembly 314 over which it is disposed. If it is assumed that the curvature of the cover lens is negligible, the air gap 322 can be approximated according to Equation 6, and the plane coefficients may be calculated by the method of least squares fitting, shown in Equation 7, where each $d_i$ corresponds to a unique sensor (e.g., a capacitive pixel) having coordinates $(x_i,y_i)$. In various sensor designs, the $\Delta Ct$ response at the edges of the sensing region may be distorted (e.g., due to interference from routing traces). Accordingly, measurements acquired from the edges of the sensing region may be excluded from plane coefficient calculations.

$$d_{air\,gap\,current}(x, y) = ax + by + c \quad (\text{Eq. 6})$$

$$\begin{bmatrix} a \\ b \\ c \end{bmatrix} = \begin{bmatrix} x_1 & y_1 & 1 \\ \vdots & \vdots & \vdots \\ x_{number\,of\,pixels} & y_{number\,of\,pixels} & 1 \end{bmatrix} \div \begin{bmatrix} d_i \\ \vdots \\ d_{i\,number\,of\,pixels} \end{bmatrix} \quad (\text{Eq. 7})$$

After calculating the plane coefficients associated with the air gap 322, the coefficients may be stored in a memory associated with the sensor device. The coefficients then may be retrieved to perform compensation for deviations in the distance across the air gap 322 during operation of the sensor device, as described below with respect to FIG. 6.

In other embodiments, if the tilt of the cover lens with respect to the sensor assembly is negligible and/or the air gap is relatively uniform, instead of determining plane coefficients (a,b,c), a signal air gap height parameter may be determined (i.e., a=b=0, c=$d_{air\,gap}$).

In one embodiment, the techniques illustrated in FIG. 5 may be performed as a per part calibration process of one or more sensor devices. For example, after assembly of a sensor device, the sensor device may be connected to an external computing system and the calibration procedures discussed above may be performed by a software program executing on the external computing system. The resulting calibration values (e.g., plane coefficients, scaling factors, etc.) may then be stored in a non-volatile memory of the sensor device. In other embodiments, after assembly of a sensor device, the calibration procedures discussed above may be performed with a software program executing on the sensor device itself such that no connection to an external computing system is required. The internal software program may then determine calibration values and store the values to a non-volatile memory. In still other embodiments, the techniques illustrated in FIG. 5 may be performed with a nominal sensor device, and/or these techniques may be performed by the end-user of the sensor device.

FIG. 6 is a flow diagram of a method 600 for performing compensation for an air gap 322 during operation of a sensor device, such as input device 100 of FIG. 1. Although the method 600 is described in conjunction with FIGS. 1-5, persons skilled in the art will understand that any system configured to perform the method, in any appropriate order, falls within the scope of the present invention.

The method 600 begins at step 610, where a nominal sensor constant $K_{sensor}$ and plane coefficients (a,b,c) are read from a memory associated with the sensor device. In one embodiment, the nominal sensor constant $K_{sensor}$ and plane coefficients (a,b,c) may be retrieved from a memory 260 by the determination module 250 of input device 100. At step 612, the nominal sensor constant $K_{sensor}$ and plane coefficients (a,b,c) are used to calculate one or more scaling factors $S_i$. The one or more scaling factors $S_i$ may be calculated according to Equation 8, shown below. In one embodiment, a scaling factor may be calculated for each capacitive pixel (i) in the sensor assembly 314 of input device 100.

$$S_i = \frac{d_{lens} + \varepsilon_{lens} \times d_{air\,gap\,nominal}}{d_{lens} + \varepsilon_{lens} \times d_{air\,gap\,current}(x_i, y_i)} = \quad (\text{Eq. 8})$$

$$\frac{d_{lens} + \varepsilon_{lens} \times d_{air\,gap\,nominal}}{d_{lens} + \varepsilon_{lens} \times (ax_i + by_i + c)}$$

Next, at step 614, one or more capacitance values Ct(x,y) (e.g., a capacitive frame) are captured with the sensor device.

At step 616, the one or more capacitance values Ct(x,y) are used to calculate a change in capacitance ΔCt(x,y) as a function of location in the sensing region, or location on the sensor assembly 314, of the sensor device. For example, the change in capacitance may be calculated by comparing the one or more capacitance values Ct(x,y) to baseline capacitance values for the sensor device.

At step 618, air gap compensation is performed on one or more of the change in capacitance ΔCt(x,y) values. For example, compensation may be performed by multiplying the change in capacitance ΔCt(x,y) values associated with a capacitive frame by one or more per capacitive pixel scaling factors $S_i$. Finally, after performing air gap compensation, the compensated values (e.g., the resulting compensated ΔCt frame) may be processed to determine the presence or absence of one or more input objects 140 at step 620.

FIG. 7 is a flow diagram of a method 700 for determining an air gap 322, calculating plane coefficients, and performing compensation for the air gap 322 during operation of a sensor device, such as input device 100 of FIG. 1. Although the method 700 is described in conjunction with FIGS. 1-4, persons skilled in the art will understand that any system configured to perform the method, in any appropriate order, falls within the scope of the present invention.

The method 700 begins at step 710, where a maximum change in capacitance vector $\Delta Ct_{maximum}(x,y)$ associated with the sensor device is initiated. For example, the $\Delta Ct_{maximum}(x,y)$ vector may be retrieved from or created in the memory 260 of input device 100. At step 712, a nominal sensor constant $K_{sensor}$ and high and low values $\Delta Ct_{high}$ and $\Delta Ct_{low}$ are read from a memory associated with the sensor device. In one embodiment, the nominal sensor constant $K_{sensor}$ and high and low values $\Delta Ct_{high}$ and $\Delta Ct_{low}$ may be retrieved from the memory 260 by the determination module 250 of input device 100.

At step 714, one or more capacitance values Ct(x,y) (e.g., a capacitive frame) are captured with the sensor device, and the one or more capacitance values Ct(x,y) are used to calculate a resulting change in capacitance ΔCt(x,y) as a function of location in the sensing region, or location on the sensor assembly 314, of the sensor device.

At step 716, air gap compensation may be performed on one or more change in capacitance ΔCt(x,y) values, for example, with per capacitive pixel scaling factors $S_i$, and the compensated values may be processed to determine the presence or absence of one or more input objects 140. It is contemplated that the techniques described with respect to FIG. 7 may be performed in an on-going, dynamic manner which is transparent to the end-user. That is, plane coefficients (a,b,c) and scaling factors $S_i$ may be calculated and updated during normal operation of the sensor device. Consequently, with respect to step 716, it is assumed that scaling factors $S_i$ have already been determined and stored in a memory of the sensor device. However, if the sensor device has not previously been powered on or operated for input sensing, it is contemplated that step 716 may initially be skipped.

At steps 718 and 720, the acquired capacitance values may be filtered to ensure that inaccurate or undesirable capacitance measurements are not used in the calculation of the air gap, plane coefficients, and scaling factors. For example, at step 718, the capacitance values are analyzed to determine whether excessive force of an input object 140 may have caused one or more substrates of the sensor device (e.g., first substrate 303 of input device 100) to deflect or compress. Consequently, at step 718, the duration of time for which an input object 140 has occupied the sensing region is determined, and, if the duration of time exceeds a threshold value, the corresponding capacitance values are discarded. The threshold value may be any length of time, such as approximately 1 milliseconds (ms), 10 ms, or 100 ms. Thus, at step 718, if an input object 140 has just entered or landed in the sensing region, the resulting capacitance values are retained, and if the input object has occupied in the sensing region for more than a threshold period of time, the resulting capacitance values are discarded.

At step 720, it is determined whether one or more delta capacitance ΔCt(x,y) values exceed $\Delta Ct_{high}$. Specifically, because $\Delta Ct_{high}$ is assumed to correspond to the response for the smallest possible air gap for a given sensor type, a delta capacitance ΔCt(x,y) value which exceeds $\Delta Ct_{high}$ is assumed to be due to bending of one or more substrates (e.g., the cover lens) of the sensor device. Thus, because such a delta capacitance ΔCt(x,y) likely does not accurately reflect the air gap distance under normal operating conditions, the delta capacitance value or the entire capacitive frame may be discarded, and additional capacitive sensing may be performed at step 714. Non-saturating responses (e.g., due to input object 140 hovering, insufficient contact area, etc.) from one or more sensor locations also may be rejected, as shown below in Equation 9.

If the no delta capacitance ΔCt(x,y) value exceeds $\Delta Ct_{high}$, the delta capacitance ΔCt(x,y) values are analyzed at step 722 to determine whether any of the values is greater than the maximum value currently stored for the corresponding (x,y) coordinates in the $\Delta Ct_{maximum}(x,y)$ vector. If one or more delta capacitance ΔCt(x,y) values are greater than a value(s) stored for the corresponding (x,y) coordinates in the $\Delta Ct_{maximum}(x,y)$ vector, the $\Delta Ct_{maximum}(x,y)$ vector is updated to reflect the new value(s). The conditions under which ΔCt(x,y) values are rejected or stored in steps 720 and 722 are illustrated in Equation 9, shown below, where I is a vector of unique capacitive pixel indices and k represents discrete-time after data collection has started.

$$\text{For } \forall k > 0, \text{ if } \nexists \Delta Ct_{k,i} > \Delta Ct_{high} \text{ then } \Delta Ct_{max,k} = \Delta Ct_{max,k-1} \quad \text{(Eq. 9)}$$

else $$\Delta Ct_{max,k} = \begin{pmatrix} \text{if}(\Delta Ct_{low} \leq \Delta Ct_{k,i}) \text{ then } \Delta Ct_{max,k,i} = \\ \max(\Delta Ct_{max,k-1,i}, \Delta Ct_{k,i}) \\ \text{else } \Delta Ct_{max,k,i} = \Delta Ct_{max,k-1,i} \end{pmatrix}_{j=1 \ldots |I|, i=I(j)}$$

Next, at step 724, it is determined whether a stop condition is met. For example, a stop condition may be met once a certain number of data sets are acquired or once a certain period of time has elapsed. In other embodiments, a stop condition may be met once the frequency of updates to the $\Delta Ct_{maximum}(x,y)$ vector falls below a threshold level, or once a threshold number of updates to the $\Delta Ct_{maximum}(x,y)$ vector has occurred. An exemplary stop condition is illustrated in Equation 10, shown below.

$$\Delta Ct_{max,k,i} \geq \Delta Ct_{low}, \forall i \quad \text{(Eq. 10)}$$

If the stop condition is not yet met, additional capacitive sensing may be performed at step 714. If the stop condition is met, the $d_{air\ gap}(x,y)$, plane coefficients (a,b,c), and/or the scaling factors $S_i$ may be calculated or recalculated at step 726. For example, the plane coefficients (a,b,c) may be calculated or recalculated according to Equations 6 and 7, shown above. In addition, the scaling factors $S_i$ may be calculated according to Equation 8, shown above, and the $d_{air\ gap}(x,y)$ may be calculated according to Equation 11, shown below.

$$d_{air\ gap\ current}(x, y) = \frac{K_{sensor} \times d_{lens} \times \varepsilon_{lens} - \Delta Ct_{max}(x, y) \times d_{lens}}{\Delta Ct_{max}(x, y) \times \varepsilon_{lens} - K_{sensor} \times \varepsilon_{lens}} \quad \text{(Eq. 11)}$$

Accordingly, by tracking the maximum delta capacitance values $\Delta Ct_{maximum}(x,y)$ for each location in the sensing region of the sensor device (e.g., sensing region 120 of input device 100), an air gap 322 may be determined as a function of location, and plane coefficients and scaling factors may be calculated. Further, the plane coefficients and scaling factors may be dynamically updated during operation of the sensor device to increase the accuracy of these values and ensure that air gap compensation is performed in an efficient manner.

Figure 8:
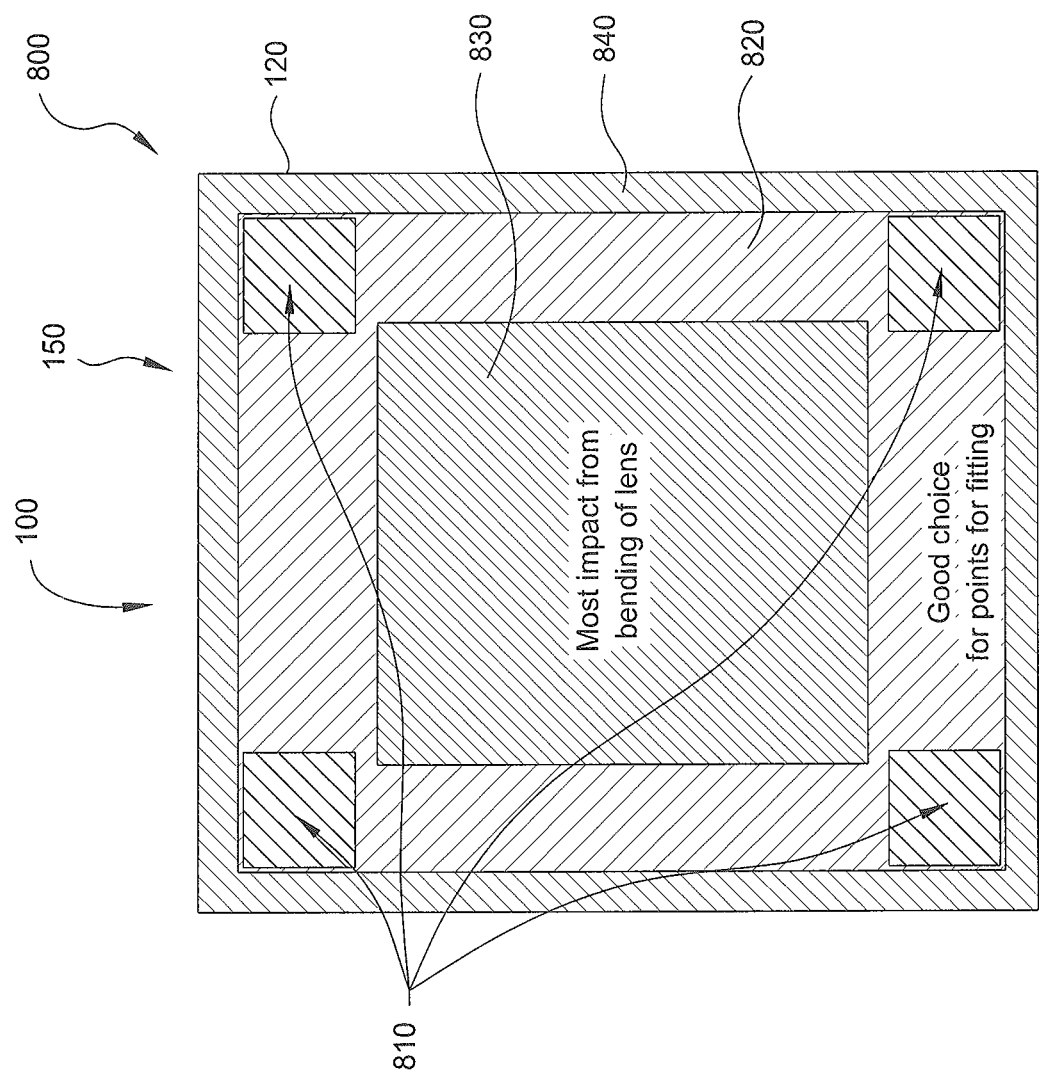
FIG. 8 illustrates exemplary sensing region locations for calibrating an input device.

The techniques described in FIGS. 4-7 may be performed during normal operation of a sensor device, or these techniques may be performed during a dedicated calibration period of the sensor device. For example, in one embodiment, a calibrator (e.g., an end-user) may be presented with instructions regarding how to calibrate the sensor device (e.g., for air gap compensation). Such instructions may include an on-screen guide instructing the calibrator to place an input object 140 on one or more locations of the sensing region of the sensor device. Additionally, the calibrator may be instructed to perform one or more input gestures, for example, by swiping or sliding an input object 140 across the sensing region of the sensor device. FIG. 8 illustrates exemplary sensing region locations 800 (e.g., indices in vector I) for calibrating an input device, such as input device 100 of FIG. 1. For example, a calibrator may be instructed to place an input object 140 on one or more of the first plurality of locations 810. Delta capacitance values then may be acquired at the first plurality of locations 810, and the air gap, plane coefficients, and/or scaling factors associated with the sensor device may be determined from these delta capacitance values.

Using one or more of the first plurality of locations 810 during sensor device calibration may increase the accuracy of calibration. Specifically, whereas region 830, near the center of the sensing region, may bend or deflect in response to the pressure of an input object 140, and region 840, near the edges of the sensing region, may be affected by routing circuitry and/or edge effects, the first plurality of locations 810 are less affected by these sources of error. Additionally, for similar reasons, region 820 may be suitable for calibrating the sensor device.

In other embodiments, the calibrator or end-user may not be presented with explicit instructions regarding how to calibrate the sensor device. Instead, data may be collected during normal operation of the sensor device. Once capacitance values have been collected for a particular set of indices, the air gap, plane coefficients, and/or scaling factors associated with the sensor device may then be determined. Additionally, several alternative sets of indices for vector I may be included in the sensor device memory, and the set acquired first may be used to determine the air gap, plane coefficients, scaling factors, etc.

$$\Delta Ct_{max} \Bigg/ \Bigg( \Delta Ct_{saturation\ nominal} \times \Bigg( \arg\Bigg( \max_{x,y} \Bigg( \Bigg| \frac{\varepsilon_{lens}(d_{lens} + a_{prev} \times x + b_{prev} \times y + c_{prev})}{d_{lens} + \varepsilon_{lens}(a_{prev} \times x + b_{prev} \times y + c_{prev})} - \frac{\varepsilon_{lens}(d_{lens} + ax + by + c)}{d_{lens} + \varepsilon_{lens}(ax + by + c)} \Bigg| \times K_{sensor} \Bigg) \Bigg) \Bigg) \Bigg) > \quad \text{(Eq. 12)}$$
threshold value $$\frac{\Delta Ct_{max}}{\max_{x,y}(\Delta Ct_{saturation\ nominal}(x, y))} > \text{threshold value} \quad \text{(Eq. 13)}$$

A sensor device (e.g., input device 100) may use internal or external non-volatile memory for persistent storage of sensor device parameters (e.g., air gap, plane coefficients, scaling factors, etc.). However, non-volatile memory (e.g., flash memory) may support a limited number of write cycles per block, limiting the number of times sensor device parameters may be stored or updated before memory degradation or failure. Accordingly, sensor device parameters may be stored in a memory of the sensor device, or in a memory associated with the sensor device, in a variety of ways.

One approach may reduce the number of memory updates by comparing recently estimated device parameters to previously stored device parameters. For example, a value previously stored in memory may be updated if one (or both) of the following conditions, shown in "Equations" 12 and 13, are satisfied.

In another approach for performing memory updates, one or more additional memory blocks may be allocated once a predetermined number of write cycles have been performed with the current memory block(s). In yet another approach for performing memory updates, instead of performing erase-write transactions on a whole memory block, new values may be appended to a sequence of previous estimates in pre-allocated part(s) of the memory. The pre-allocated part(s) may include a fraction of a memory block, an entire memory block, or more than one memory block. Once all of the space in the pre-allocated part(s) is utilized for a sequence of values, the sequence of values may be processed to produce an estimate (e.g., an average, a median, etc.), which may be stored to memory. Such an estimate may be performed, for example, at the next device power-on or reset.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

The invention claimed is:

1. A processing system for a display device integrated with a capacitive sensing device comprising:
    a driver module comprising driver circuitry, the driver module coupled to a plurality of common electrodes configured to be driven for display updating and capacitive sensing;
    a receiver module coupled to a plurality of receiver electrodes and configured for receiving resulting signals with the receiver electrodes when the plurality of common electrodes are driven for capacitive sensing by the driver module; and
    a determination module configured for:
        determining a first capacitive image based on the resulting signals;

comparing the first capacitive image to a baseline capacitive image to determine a delta capacitive image;
comparing the delta capacitive image to one or more saturation capacitance values;
in response to the comparing, replacing the one or more saturation capacitance values with one or more capacitance values from the delta capacitive image; and
determining one or more calibration values based on the one or more saturation capacitance values, wherein the one or more calibration values calibrate for an air gap defined between a cover lens of a display device integrated with a capacitive sensing device and the plurality of common electrodes.

2. The processing system of claim 1, wherein determining the one or more calibration values comprises fitting a plane to the one or more saturation capacitance values.

3. The processing system of claim 1, wherein determining the first capacitive image comprises instructing a user to place an input object on one or more predetermined input locations.

4. The processing system of claim 3, wherein the one or more predetermined input locations comprise at least one of:
at least three input areas;
one or more one-dimensional sliding areas;
one or more zero-dimensional input locations; and
a plurality of input locations along the perimeter of the capacitive sensing device.

5. The processing system of claim 1, wherein the determination module is further configured for determining the one or more calibration values based on at least one of:
a predetermined number of capacitive images, wherein at least one of the predetermined number capacitive images comprises effects due to an input object; and
capacitive images associated with one or more predetermined input areas.

6. The processing system of claim 1, wherein each of the one or more saturation capacitance values is associated with a sensing region location.

7. The processing system of claim 1, wherein the determination module is further configured for determining that the one or more saturation capacitance values should not be replaced with the one or more capacitance values because the one or more capacitance values exceed a threshold value.

8. The processing system of claim 1, wherein the determination module is further configured for:
determining a second capacitive image based on the resulting signals; and
modifying the second capacitive image based on the one or more calibration values.

9. The processing system of claim 1, wherein the determination module is further configured for:
determining a duration of time for which an input object has occupied an input sensing region; and
determining that the duration of time exceeds a threshold value; and
based on the duration of time exceeding the threshold value, determining that a third capacitive image should not be used to determine the one or more calibration values.

10. A display device integrated with a capacitive sensing device comprising:
a plurality of common electrodes;
a plurality of receiver electrodes;
a processing system coupled to the plurality of common electrodes and the plurality of receiver electrodes, the processing system configured to:
drive the plurality of common electrodes for display updating and capacitive sensing;
receive resulting signals with the receiver electrodes when the plurality of common electrodes are driven for capacitive sensing;
determine a first capacitive image based on the resulting signals;
compare the first capacitive image to a baseline capacitive image to determine a delta capacitive image;
compare the delta capacitive image to one or more saturation capacitance values;
in response to the comparison, replace the one or more saturation capacitance values with one or more capacitance values from the delta capacitive image; and
determine one or more calibration values based on the one or more saturation capacitance values; and
a cover lens disposed over the plurality of common electrodes, wherein the one or more calibration values calibrate for an air gap defined between the cover lens and the plurality of common electrodes.

11. The display device of claim 10, wherein the processing system is configured to determine the one or more calibration values by fitting a plane to the one or more saturation capacitance values.

12. The display device of claim 10, wherein the processing system is configured to determine the first capacitive image by instructing a user to place an input object on one or more predetermined sensing region locations, the one or more predetermined sensing region locations comprising at least one of:
at least three input areas;
one or more one-dimensional sliding areas;
one or more zero-dimensional sensing region locations; and
a plurality of sensing region locations along the perimeter of the capacitive sensing device.

13. The display device of claim 10, wherein the processing system is further configured to determine the one or more calibration values based on at least one of:
a predetermined number of capacitive images, wherein at least one of the predetermined number capacitive images comprises effects due to an input object; and
capacitive images associated with one or more predetermined input areas.

14. The display device of claim 10, wherein each of the one or more saturation capacitance values is associated with a sensing region location.

15. A method of capacitive sensing with a display device integrated with a capacitive sensing device having a plurality of common electrodes and a plurality of receiver electrodes, the method comprising:
driving the plurality of common electrodes for display updating and capacitive sensing;
receiving resulting signals from the receiver electrodes when the plurality of common electrodes are driven for capacitive sensing;
determining a first capacitive image based on the resulting signals;
comparing the first capacitive image to a baseline capacitive image to determine a delta capacitive image;
comparing the delta capacitive image to one or more saturation capacitance values;
in response to the comparing, replacing the one or more saturation capacitance values with one or more capacitance values from the delta capacitive image; and determining one or more calibration values based on the one or more saturation capacitance values, wherein the one or more calibration values calibrate for an air gap defined between a cover lens of a display device integrated with a capacitive sensing device and the plurality of common electrodes.

16. The method of claim 15, wherein determining the one or more calibration values comprises fitting a plane to the one or more saturation capacitance values.

17. The method of claim 15, wherein determining the first capacitive image comprises instructing a user to place an input object on one or more predetermined sensing region locations, the one or more predetermined sensing region locations comprising at least one of:
 at least three input areas;
 one or more one-dimensional sliding areas;
 one or more zero-dimensional sensing region locations; and
 a plurality of sensing region locations along the perimeter of the capacitive sensing device.

18. The method of claim 15, wherein determining the one or more calibration values based on at least one of:
 a predetermined number of capacitive images, wherein at least one of the predetermined number capacitive images comprises effects due to an input object; and
 capacitive images associated with one or more predetermined input areas.

19. The method of claim 15, wherein each of the one or more saturation capacitance values is associated with a sensing region location.

20. The method of claim 15, further comprising:
 determining a duration of time for which an input object has occupied an input sensing region; and
 determining that the duration of time exceeds a threshold value; and
 based on the duration of time exceeding the threshold value, determining that a third capacitive image should not be used to determine the one or more calibration values.

* * * * *